Feb. 16, 1937. C. S. HEALY 2,070,862
APPARATUS FOR TESTING THE VISCOSITY OF LIQUIDS
Filed March 2, 1933 3 Sheets-Sheet 2
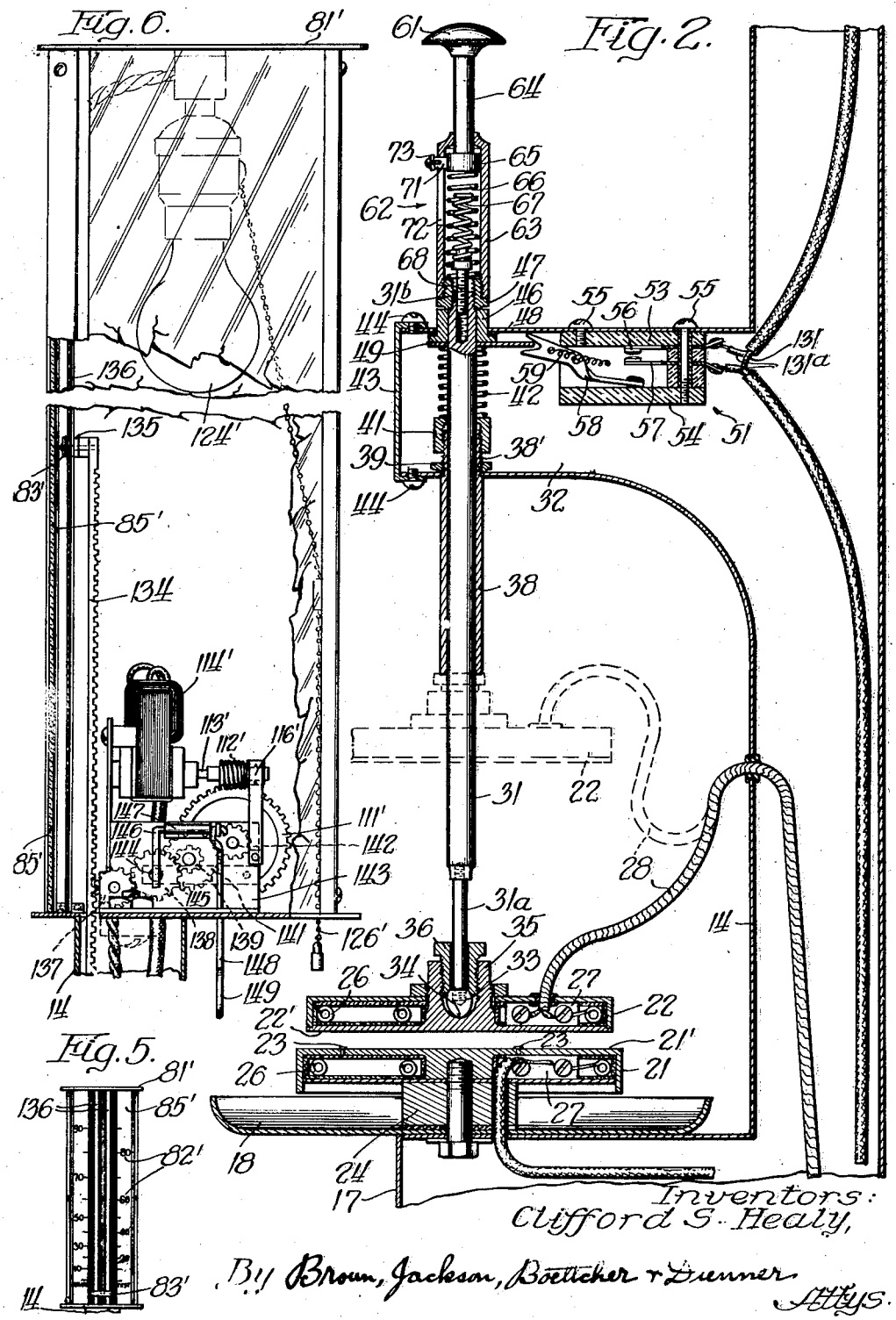

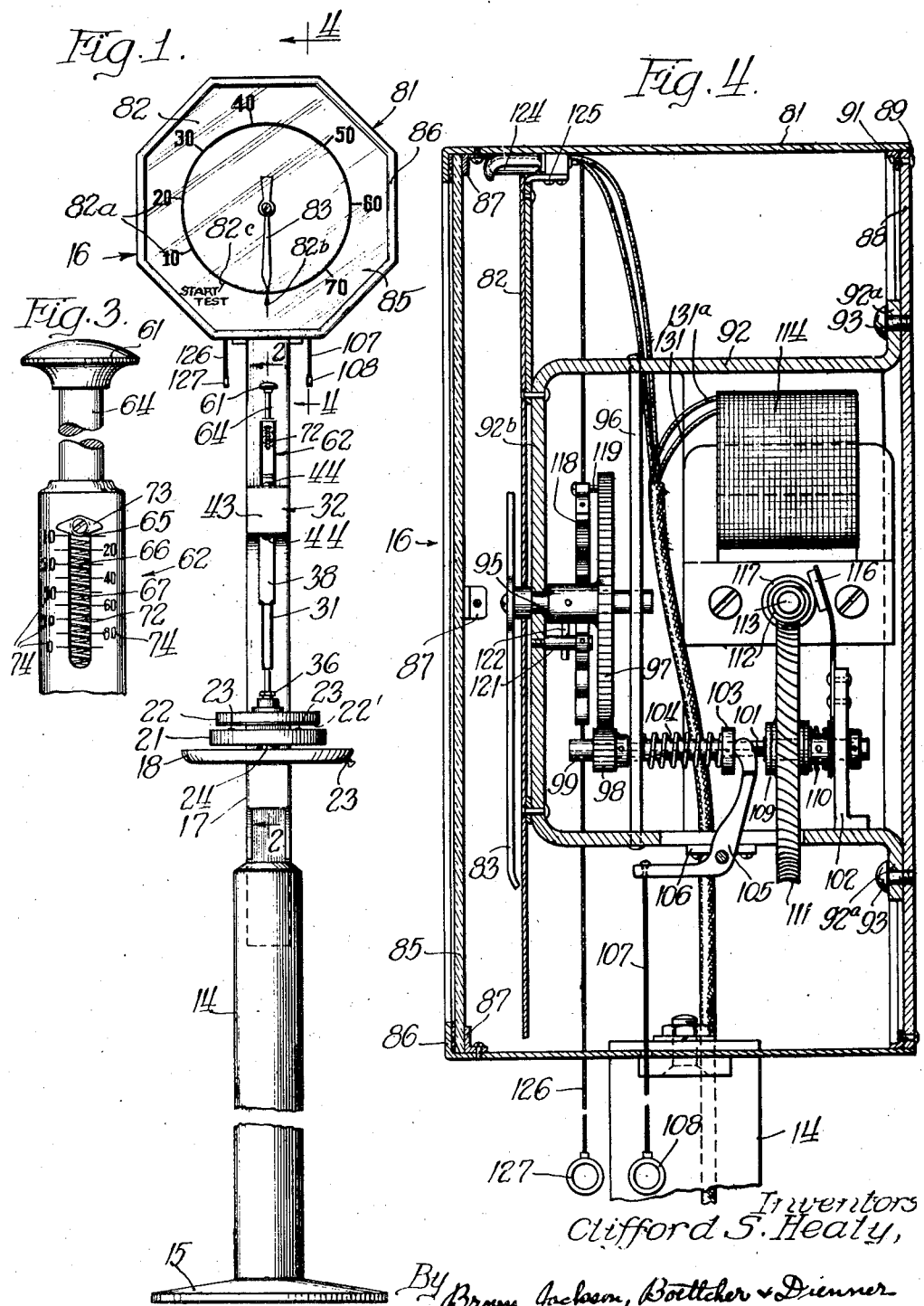

Feb. 16, 1937.　　　C. S. HEALY　　　2,070,862
APPARATUS FOR TESTING THE VISCOSITY OF LIQUIDS
Filed March 2, 1933　　　3 Sheets-Sheet 3
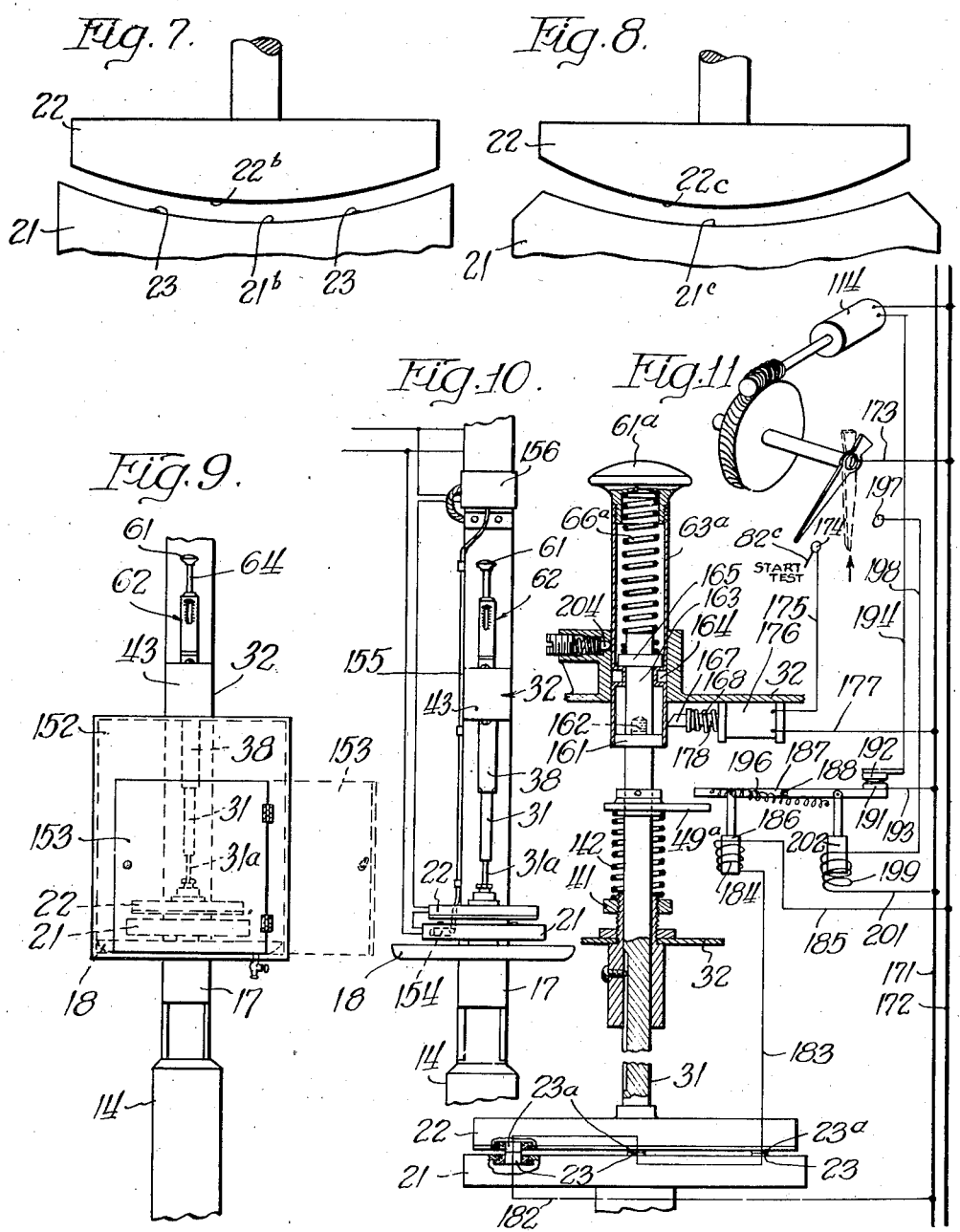
Inventors:
Clifford S. Healy,
By Brown, Jackson, Boettcher & Dienner
Attys.

Patented Feb. 16, 1937

2,070,862

UNITED STATES PATENT OFFICE 2,070,862

APPARATUS FOR TESTING THE VISCOSITY OF LIQUIDS

Clifford S. Healy, Chicago, Ill.

Application March 2, 1933, Serial No. 659,300

5 Claims. (Cl. 265—11)

The present invention relates to an improved apparatus for testing the viscosity of liquids. More particularly, it has to do with determining the viscosity of lubricating oils, although, as will hereinafter appear, it may be also used to determine the viscosity, cohesion and like properties of other liquids.

One of the objects of the invention is to provide an improved viscosity testing apparatus which is capable of performance in a quick, easy and convenient manner, without requiring any special technical knowledge or training. These attributes open a field of utility which has been almost entirely neglected heretofore, namely, that of providing viscosity testing apparatus which can be used in any gasoline filling station, garage or the like, and which can be operated by any attendant, or even by the motorist himself, without requiring any technical skill. To this end, the human element, with its possible errors, has been substantially eliminated from the performance of the test so that the apparatus is almost entirely automatic in its operation, the only manual operations required being those of applying a specimen of the oil between two surfaces and applying a pressure to the oil film between these surfaces. Obviously, this represents a decided simplification over laboratory viscosimeters operating on the drip principle, etc., which require special skill in their use. Moreover, the present testing operation can be performed in but a minute or two, while the motorist is waiting, which is not true in the case of most prior methods.

Another object of the invention is to provide a viscosity testing apparatus which will give a direct reading indication of the viscosity. For example, in the present application I have shown one embodiment employing a rotating pointer and another embodiment employing a reciprocating pointer, both of which indicate by direct number designation the viscosity of the specimen under test. This is of decided advantage, as it avoids the necessity of computation, reference to charts, etc., and is more persuasive to the motorist.

Another object of the invention is to provide apparatus for testing the viscosity of lubricating oils which arrives at a determination of viscosity by testing the resistance which a film of the oil established between two surfaces offers to separation of the surfaces. In the preferred manner of carrying out my invention, a specimen of the oil is spread in the form of a film between two wettable surfaces, and this film is preferably made sufficiently thin so that it is subject to surface tension, whereby said film resists separation of the surfaces. I have discovered that the resistance which the film of oil presents to separation of the surfaces has a time factor which is a relatively accurate measure of the viscosity of the oil. That is to say, assuming that the cooperating plate surfaces preliminarily establish a definite area of film and a definite thickness of film, and establish a substantially predetermined temperature in this film, and assuming that a known pressure or pull is externally applied to one of these plate surfaces, tending to separate it from the other, I have found that the length of time that this pressure or pull must be exerted before complete separation of the plates occurs is a relatively accurate measure of the viscosity of the oil. As remarked above, it is one of the objects of the invention to provide improved apparatus utilizing this principle for testing the viscosity of oils.

Another object of the invention is to provide a device of the above general description characterized by an improved time measuring mechanism which serves to indicate the viscosity of the oil.

Another object of the invention is to provide a viscosity testing device characterized by an improved manner of heating the plate surfaces, and controlling said heating, to the end of maintaining said surfaces at a substantially constant temperature.

Another object is to provide improved automatic controls for the machine.

Other objects and advantages of the invention will appear in the following detailed description of certain preferred embodiments thereof. In the accompanying drawings illustrating such embodiments:

Figure 1 is a front elevational view of one embodiment of the invention;

Figure 2 is a transverse sectional view (taken approximately on the plane of the line 2—2 of Figure 1) through the supporting standard, plate surfaces, spring mechanism, etc.;

Figure 3 is a fragmentary elevational view of the pressure gage for indicating the converging pressure established between the plates;

Figure 4 is a transverse vertical sectional view (taken approximately on the plane of the line 4—4 of Figure 1) through the indicator head portion of the device;

Figure 5 is a front elevational view of a modified construction of indicator head;

Figure 6 is a side view of the latter indicator head, partly in section;

Figures 7 and 8 are detail views showing different forms of plate elements;

Figure 9 is an elevational view showing the provision of an enclosing casing or oven for the plate elements;

Figure 10 is a fragmentary elevational view showing a modified arrangement for effecting heat control; and Figure 11 is a diagrammatic view illustrating certain automatic controls.

Referring first to Figures 1–3, the various operating parts are preferably mounted on a support in the form of a standard 14 rising from a base 15. At the upper end of said standard is a head portion 16 which carries the direct reading indicating mechanism. Projecting forwardly from an intermediate part of this standard is an arm 17 which supports a refuse receptacle 18 and a lower plate element 21. Cooperating with this lower plate element is the upper movable plate element 22, which is preferably of slightly smaller diameter than the lower plate element. The purpose of the refuse receptacle 18 is merely to collect such excess oil as may be squeezed out from between the two plate elements in establishing the film of oil between these elements. This receptacle is preferably in the form of a shallow cup-shaped pan, and may be provided with a spigot or other drain outlet 23 for draining an accumulation of oil from the receptacle. The lower plate element 21 is disposed centrally of the receptacle 18 and may be supported in contact therewith; although in the preferred construction I space said plate element above the bottom of the receptacle on a short spacing post 24, mainly of heat insulating material, to the end of thermally insulating the lower plate element 21 from the receptacle 18 and from oil contained therein.

Referring to Figure 2, one of the plate elements, preferably the lower element 21, has short spacing studs 23 projecting upwardly from the top surface at three or more points for predetermining the thickness of the oil film when the other plate element is forced into contact with these studs. The height of these studs might be varied for different uses and different liquids, but for oils of the viscosity range ordinarily used for automotive and like work, I find that good results are obtained by having the studs project a height of approximately .005 of an inch. If desired, the upper ends of these studs may present pointed or rounded surfaces to preclude the possibility of any film of oil being maintained between the top surfaces of said studs and the bottom surface 22' of the upper plate element when said plate element is forced against said stops.

The coacting surfaces 21', 22', of the two plate elements are preferably composed of a material such as aluminum, copper, etc. which will be readily wetted by the oil and will have high heat transfer for quickly heating the thin film of oil to the temperature substantially predetermined by said plate elements. Preferably, both plate elements are heated, and to this end they each include a hollow housing portion in which is confined an electrical heating element 26. For maintaining these devices at a substantially constant temperature, each includes a thermostatic control switch 27 preferably disposed adjacent to the center of the disk-shaped plate element. These thermostatic control switches are well known devices and need not be illustrated or described in detail. When the machine is to test automobile engine oils, these thermostatic switches are set to maintain the plate elements 21 to 22 at a temperature corresponding to some oil temperature in the engine, such as the average crank case temperature under operating conditions.

The feed wires connecting with the heating element in the lower plate element 21 may extend down through the spacing post 24 and through the arm 17 in passing back into the standard 14; and the feed wires connecting with the heating element of the upper plate element preferably extend therefrom to the standard 14 in the form of a flexible connection 28 which permits the upper plate element to be raised and lowered. In a later embodiment I shall hereinafter describe how a single thermostatic switch may be arranged to control the temperatures of both plate elements.

The upper plate element 22 is secured on the lower end of a reciprocable plunger 31 which is guided for vertical movement in an upper arm 32 also projecting forwardly from the standard 14. Referring to Figure 2, this upper plate 22 has a universally rockable mounting on the plunger 31, afforded preferably by a substantially spherical or pointed head member 33 on the rod arranged to seat against a substantially spherical or rounded surface 34 formed in a boss 35 projecting up centrally from the plate element. A gland nut 36 screws down into the boss 35 and bears against the top side of the head 33, the reduced plunger extension 31a having a relatively loose fit in the bore of said gland nut to accommodate the slight rocking of the plate relatively to the plunger. This mounting of the upper plate element insures that said plate element will always contact uniformly with the several spacing studs 23 in predetermining a film of oil of uniform thickness between the plates.

The supporting arm 32 is hollow and the plunger 31 extends through the top and bottom walls thereof. Fixedly secured in the lower wall is a depending tubular guide 38 surrounding the plunger and having a threaded upper end 38' within the supporting arm 32. A nut 39 screws down over the threaded end 38' and bears against the top side of the bottom wall of said supporting arm for securing the tubular guide 38 in place. An adjusting nut 41 also screws down over the threaded end 38' of the guide. The latter nut serves as an adjustable bottom stop for a compression spring 42 which surrounds the plunger within the arm 32. Access to these parts is afforded by a removable front plate 43 which is secured over the open front end of the hollow arm 32 by screws 44. The upper end of the spring 42 thrusts upwardly against a collar 46 which abuts against the nut 47, screwing downwardly over the reduced threaded end 31b of the plunger rod. A cushioning washer 48 may be disposed above the flanged lower end of the collar 46, and a switch actuating member 49 is arranged to move with the collar 46, the latter actuating member being shown in the form of a plate confined between the spring and the collar and having a projecting arm cooperating with the actuating mechanism of an electric switch 51. Said switch may be of any suitable type, in the embodiment shown consisting of upper and lower spaced insulating plates 53 and 54 secured to the top wall of the hollow arm 32 by screws 55 and carrying stationary and movable contacts 56 and 57. A switch actuating member 58 is pivotally supported between the top and bottom insulating plates and has a forked end in which engages the projecting arm of the switch operating member 49. The other end of the member 58 is adapted to swing upwardly and press the movable contact 57 against the stationary contact 56 when the plunger 31 moves downwardly. A tension spring 59 is extended between a pin on the member 58 and a fixed point of anchorage in such relation as to exert a biasing action on the member 58 for imparting a snap motion thereto in either direction of movement.

In the embodiment being described, after a specimen of the oil has been spread out on the lower plate 21, the upper plate is forced downwardly against this oil by the exertion of downward pressure on an upper knob 61. The downward pressure exerted on this knob must be sufficient so that, irrespective of the viscosity of the oil, the upper plate will be forced down into contact with the studs 23. As previously remarked, these studs insure that all oils will be tested at the same thickness of film between the plates, and it will be evident that when an oil of relatively heavy viscosity is inserted between the plates it will require a greater pressure to bring the upper plate down against said studs within a reasonably short space of time than it would require with a lighter viscosity of oil. It is within the scope of my invention to have the knob 61 connected as a rigid part of the plunger 31 so that the pressure imparted to said knob is transmitted directly to the upper plate. In this case, however, dependence would be placed upon the operator always exerting a sufficiently heavy downward pressure on said knob adequate to overcome the opposing pressure of the lifting spring 42 and also to exert the necessary downward pressure on the oil to bring the upper plate against the studs 23, irrespective of the viscosity of the oil. This introduces a source of possible error, because, if the operator did not exert sufficient downward pressure to bring the upper plate into contact with the studs against a heavy body of oil, the reading of that test would likely be erroneous. Accordingly, I have found it desirable, although not essential, to interpose a pressure gauge between the knob 61 and the plunger 31 which will indicate the downward pressure being exerted on the knob, whereby to insure that this pressure is adequate in view of the apparent viscosity of the oil. This pressure gauge, generally designated 62, comprises a sleeve 63 screwing down over the externally threaded upper end of the nut 47 and having a reduced upper end in which is guided the stem 64 of the knob. A head 65 on the lower end of this stem is arranged to cooperate with two compression springs 66 and 67 confined within the sleeve 63. The lower end of the outer spring 66 abuts against the top of the nut 47, and the lower end of the inner spring 67 abuts against the shouldered upper head of an adjusting screw 68 which threads down into the plunger 31. Threading the latter screw upwardly or downwardly (with the sleeve 63 removed), is operative to adjust either the pressure that the inner spring normally exerts against the head 65 or the distance which this head must move downwardly before encountering the inner spring. A stud 71 projects laterally from the head 65 through a vertical slot 72 in the sleeve 63 and carries the pointer 73, which cooperates with pressure graduation 74 (Fig. 3) marked down along the sides of the slot 72. These markings are so graduated that when the pointer 73 is designating "40", the above described spring arrangement is exerting sufficient downward pressure to overcome the lifting spring 42 and to transmit, in addition, sufficient force to the upper plate 22 for causing this plate to move downwardly against the studs 23 in a rather brief interval of time against oil having a body corresponding to S. A. E. 40—and, of course, other indications on the pressure gauge will also do the same with other oils of corresponding viscosity. Thus, the provision of the pressure gauge insures that the attendant will exert at least a sufficient degree of downward pressure on the knob 61 to promptly bring the upper plate element down against the studs 23.

Referring now to the indicator head portion 16, it will be seen from Figures 1 and 4 that this portion of the device comprises a circular or polygonal casing 81 enclosing a numbered dial 82 and a rotating pointer arm 83 cooperating therewith. The major scale graduations 82a are designated 10—20—30 etc., corresponding to S. A. E. designations of different viscosities. The front of the casing 81 is closed by a glass plate 85, suitably confined between a front marginal flange 86 and bracket clips 87 engaging the backside of the glass and secured to the housing. The operating parts preferably have unit assembly upon a back plate 88 which is removably secured at the rear end of the housing, as by screws 89 threading into a flanged ring 91 secured to the housing. A yoke-shaped supporting member 92 has attaching portions 92a secured by screws 93 to the back plate 88, and secured to the vertical front bar portion 92b thereof is the dial disc 82. The shaft 95 carrying the pointer 83 is journaled in this front bar portion 92b and in a supporting plate 96 spaced rearwardly therefrom. Secured to said shaft 95 is a spur gear 97 which is driven by a spur pinion 98. The latter is fixedly secured to a sleeve 99, which is arranged for non-rotative sliding movement on a shaft 101, which may be provided for by splining both the shaft and sleeve, or forming both of polygonal cross-section. The sleeve 99 extends through the supporting plate 96, in which it has rotatable and slidable support, and the cylindrical rear end of the shaft 101 is journaled in a bearing bracket 102 secured to the supporting yoke 92. The rear end of the sleeve 99 terminates in a thrusting collar 103, and a compression spring 104 is confined between this collar and the back side of the supporting plate 96, the action of this spring being normally to hold the pinion 98 in mesh with the spur gear 97. The pinion can be shifted out of mesh with the gear through the actuation of a bell crank lever 105, which is pivotally supported on a pivot bracket 106 secured to the mounting member 92. One arm of this bell crank lever is forked to transmit thrusting motion to the collar 103, and the other arm has a pull cord 107 extending downwardly therefrom and terminating in a ring or other pull member 108, the latter depending from the bottom of the housing 81. As will hereinafter appear, downward pulling of the member 108 is operative to release the pinion 98 from the gear 97 for the purpose of permitting the pointer 83 to be restored to its initial or normal position.

A friction slip clutch 109 operatively connects a worm wheel 111 to the shaft 101, this slip clutch including a spring 110 which is so adjusted that the clutch can only slip in the event that the worm wheel continues rotating after the pointer arm 83 has reached its maximum reading. The worm wheel 111 is driven by a worm 112 mounted on the shaft 113 of an electric motor 114, the latter being supported in any suitable manner on the mounting member 92. It is desirable that the pointer 83 rotate in an approximately fixed time relation, and, accordingly, where alternating current is available I preferably employ as the motor 114 a self-starting synchronous motor operating in time phase with the current, which insures that in successive operations the pointer will be passing successive graduations 82a in the same time intervals. However, direct current motors and universal motors can also be employed with substantially equal effectiveness, because the torque load is approximately constant at all times. In order to assure immediate stopping of the motor as soon as its current supply is interrupted by the switch 51, there is provided a friction brake arm 116 which bears against a collar or drum 117 on the motor shaft. It will be understood that other forms of speed reducing gearing may be employed in lieu of the worm gearing 111, 112. In the resetting operation, as soon as the pinion 98 is shifted out of mesh with the gear 97, the pointer is swung back to its initial position by the action of a spiral spring 118. The outer end of this spring is secured to a stud 119 projecting laterally from the gear 97, and the inner end of said spring is secured to a stud 121 projecting inwardly from the mounting member 92. A stop pin 122 projects from the hub of the gear 97 and is adapted to engage the stud 121 for stopping the resetting motion of the pointer with the latter in registry with its initial or normal position. The face of the dial 82 may be illuminated by an electric light bulb 124, which has its socket secured to a bracket 125 mounted on the upper portion of the dial. A suitable switch in the circuit of this bulb may be arranged to be controlled by a pull cord 126 hanging down through the bottom of the housing and having a pull ring 127 at its lower end. All of the parts above described can be removed as a unit assembly along with the back plate 88 by the simple disconnection of the pull cords and the electrical conductors.

The switch 51 is connected in series in the circuit of the motor 114, which circuit is conventionally represented by the conductors 131, 131a, so that the motor starts and stops with the closing and opening of the switch contacts 56, 57.

The operation of this embodiment is as follows:—

A specimen of the oil is placed on the lower plate 21 in a sufficient quantity to form the required thickness of film over the entire area of the plate. In this regard, while the full line position of the upper plate 22 indicates its normal position in which it is normally held by the spring 42, this upper plate can be raised to an elevated position, substantially as indicated in dotted lines, in order to afford more convenient access to the surfaces of the plates. For raising the upper plates, the operator merely pulls upwardly on the knob 61, thereby sliding the plunger 31 upwardly through the collar 46 and elevating the stop nut 47 from the top of said collar. The engagement of said stop nut against the top of said collar determines the normal position of the upper plate. Both plates have previously been heated by the passage of current through their heating elements 26 and are now at the normal temperature maintained by the thermostatic control switches 27. In practice, I have found good results to be obtained by maintaining these plates at a temperature of approximately 120° F., although it will be understood that successful operation is not limited to this temperature. Having placed the specimen of oil on the lower plate 21, the knob 61 is now thrust downwardly to bring the top plate 22 down against this oil. By observing the pressure gauge 62 at this time, the operator is assured that he is exerting a sufficient downward pressure commensurate with the apparent thickness of the oil; there is no objection to exerting a greater pressure than is actually necessary, the pressure gauge 62 serving primarily to indicate that sufficient pressure is being exerted to force the upper plate 22 down against the studs 23 within a relatively short time interval. As soon as the operator pressed downwardly on the knob 61, the motion which he transmitted through the plunger rod 31 effected the closing of the switch 51. This immediately started the motor 114 to rotating, and consequently the indicator arm 83 starts moving from its initial point 82b toward the "start test" position 82c. The operator holds the knob 61 pressed downwardly during the time interval that the pointer is moving between these two positions. This time interval is several seconds long, or of sufficient duration to insure, first, that the upper plate 22 will be forced against the studs 23 and, second, that the relatively thin film of oil thus predetermined between the two plates shall have been heated substantially to the temperature of the plates. At the instant that the pointer arm 83 reaches the "start test" position 82c, the operator releases the knob 61. Thereupon, the testing time interval starts, during which the two plates are subjected to the relative separating pressure exerted by the predetermined pressure of the spring 42, which separating pressure is resisted by the surface tension and cohesion of the oil film. During this time, the switch 51, of course, remains closed because of the lowered position of the plunger 31 and plate 22, and consequently the indicating pointer 83 continues its rotative movement. Observation of the action taking place between the plates indicates that the adhesion or surface tension between the oil film and the plates maintains the film at a more or less constant area until a time near the mid-point or approaching the end of the test interval. With the gradual separation of the plates, the concave meniscus recedes inwardly around the body of oil, with the result that the specimen is constantly changing shape or reducing its effective area as viewed in plan. That is to say, the horizontal area of the body of oil decreases and its vertical depth increases. During this gradual slight separation of the plates, the spring pressure is being resisted by the adhesion of the oil to the plates and by the cohesion of the intervening body of oil between the plates. Finally, when the effective area of the body is reduced to the point where it cannot sustain the separating tension exerted by the spring 42, rupture of the body occurs and the upper plate 22 snaps upwardly. This opens the switch 51 and the motor 114 immediately stops. The position of the pointer arm 83 at this time is an indication of the viscosity of that specimen. Preparatory to testing any other specimen, the pointer is restored to its initial position by tripping the pull cord 107, and the surfaces of the two plates 21 and 22 are cleaned to remove the oil from the previous test.

In Figures 5 and 6 I have illustrated a modified construction of indicator head 16 wherein the pointer moves with a vertical or rectilinear motion. The casing 81' is of triangular or rectangular cross-section, and at one face is provided with a vertically arranged scale or scales 82'. The indicator 83' consists of a transverse pointer secured to the upper end of a rack bar 134. The upper end of said rack bar carries a guide block 135 which slides in a guideway defined between two spaced vertical bars 136; and the pointer 83' may be secured to this guide block. The front glass 85' covers the pointer and scales. The lower portion of the rack bar extends down into the hollow standard 14 and is suitably guided to mesh with a spur gear 137. This gear is one of a train of gears 138, 139, 141, 142, and a worm wheel 111', all of which are disposed between two spaced frame plates 143, in which plates the shafts of said gears are journaled. The worm wheel 111' is driven by the worm 112' on the shaft 113' of the motor 114', and a friction brake 116' bears against a friction surface on the motor shaft, substantially as previously described. The gear 138 is arranged for sidewise shifting into and out of mesh with the gears 137 and 139, being secured to a shaft 144 which is slidably mounted in the frame plates 143. A leaf spring 145 is secured to one of these frame plates and has its end abutting against the adjacent end of said shaft, whereby to normally hold the gear 138 in mesh with its companion gears. A bell crank lever 146 is journaled in a bearing bracket 147, mounted on the opposite frame plate, and one arm of this lever extends downwardly to abut against this end of the shaft 144. A tripping link 148 has its upper end hooked to the other end of said bell crank lever and extends downwardly through the bottom of the housing, where it terminates in a pull eye 149. Pulling down on this tripping member shifts the gear 138 out of mesh and permits the rack bar 134 and pointer 83' to drop down to the normal or initial position. The scales may be translucent for illumination by an electric light 124' disposed within the housing and controlled by a pull connection 126'. The operation of this embodiment of indicator head will be manifest from the preceding description. Should the viscosity of the oil exceed the maximum reading of the machine, the spur gear 137 will merely run off the lower end of the teeth on the rack bar 134, the bar being provided with a blank space for this purpose.

I also contemplate the use of upper and lower plate elements having their surfaces curved or otherwise shaped. In Figure 7, the lower plate element 21 is formed with a concave spherically curved surface 21b, and the upper plate element 22 is formed with a convex spherically curved surface 22b. In this construction, the two surfaces 21b and 22b are of the same radius of curvature, and the spacing studs 23 are provided to predetermine the thickness of the oil film between the surfaces. In Figure 8 I have illustrated a modified construction wherein the convex spherically formed surface 22c is on a shorter radius than the concave spherically formed surface 21c. In the latter construction, the spacing studs 23 may be provided for predetermining the thickness of the body of oil confined between the two surfaces, or the central points of the two surfaces may be allowed to contact directly, whereby an oil film is established between the surfaces, increasing in thickness from the central portions of the surfaces outwardly to the peripheral edges thereof. The curved surfaces illustrated in these two figures may be desired for effecting a more rapid and even distribution of the oil film and for more rapidly forcing air bubbles outwardly from between the plates. It will be evident that when a quantity of the oil is placed within the cup-shaped surface of the lower plate element, the forcing of the upper plate element down into said body of oil will displace the oil upwardly and outwardly for quickly establishing the oil film and projecting any air from between the plates. In these constructions, the upper plate 22 may be provided with a rockable or universal joint mounting on the lower end of the plunger, or it may be rigidly secured thereto, with the plunger accurately guided in order to maintain proper relation between the curved surfaces.

Referring to Figure 9, it may be desirable to enclose the plate elements within a housing or oven 152 in order to prevent fluctuations of heat in the plate elements, particularly when the machine is disposed outdoors or in a drafty location. This housing can be secured between the two arms 17 and 32 projecting forwardly from the standard, with the housing enclosing the drip pan 18, both plate elements, and the lower portion of the plunger 31. A hinged door 153 normally closes a relatively large opening in the front of the housing, through which access can be gained for placing the oil between the plate elements and for cleaning the plate elements. Heating means, supplementary to the heating elements within the plates, may also be provided, if desired, for assisting in maintaining the air within the housing 152 at a substantially constant temperature.

Figure 10 illustrates a modified temperature controlling arrangement. Inserted in one of the plate elements, preferably the lower one, is a sealed bulb 154 containing a suitable temperature responsive fluid, such as ether, mercury, or the like. A small tube 155 extends from this bulb to an automatic switch 156 which contains a pressure responsive element responding to the rise and fall of pressure transmitted from the bulb 154 through the tube 155. This type of switch is old and well known and no detail disclosure thereof is necessary, it being sufficient to state that a rise of fluid pressure with increasing temperature is operative to open the switch and a lowering of pressure with a decrease of temperature is operative to close the switch. In such arrangement, the two heating elements of the upper and lower plates are connected together in series so that both plates receive the same current over the same time intervals determined by the switch 156. This series circuit arrangement is diagrammatically illustrated in Figure 10.

In Figure 11 I have diagrammatically illustrated certain automatic controls which may be embodied in the machine. One of these is an automatic latching arrangement which maintains the downwardly acting spring pressure on the plates and on the oil film until the pointer of the indicating head reaches the "start test" position, whereupon this latch is automatically tripped for releasing the downwardly acting pressure and permitting the upwardly acting pressure of the spring 42 to become effective. The latter spring is confined between the adjustable nut 41 and a suitable collar or shoulder 49a on the plunger. The plunger continues above this collar and is provided with an upper guide collar 161 and is also provided with a reduced threaded end 162. The collar 161 guides the vertical movement of the lower end of an enclosing sleeve 63a, and the threaded stud 162 screws into a stem 163 extending up into said sleeve. The sleeve has an annular groove 164 formed therein, and the stem 163 is provided with a head 165 which is operative to engage the upper side of the internal shoulder formed within the sleeve by said groove. A compression spring 66a is confined between the head 165 and the closed upper end of the sleeve. The sleeve 63a may be of any suitable two-part construction to permit assembling the stem 163 and spring 66a therein. The upper end of said sleeve carries the plunger knob 61a. This construction can be carried by the upper, forwardly extending arm 32, the same as previously described. Mounted within said arm is a latch 167 which is normally thrust against the lower portion of the sleeve by a spring 168. When the knob 61a is pressed downwardly through its intended range of movement, the annular groove 164 is moved down into the plane of the latch 167, which is immediately projected into said groove for preventing return movement of the sleeve 63a. The sleeve is held in this depressed position until the pointer of the indicator head arrives at the "start test" position 82c, and at this instant a circuit is closed which releases the latch 167. The main supply wires are indicated at 171 and 172, and the pointer arm is electrically connected with one of these circuit wires through a wire 173 and any suitable brush arrangement coacting with the pointer. At the "start test" position 82c, a contact 174 has insulated mounting in the dial, and the pointer arm carries a suitable clip or contacting element adapted to engage with said contact 174 when the pointer is in this position. Such completes a circuit extending through wire 175 to one side of a solenoid coil 176, and from the other side of this coil through wire 177 to the other supply wire 171. The solenoid coil attracts a core 178 which is operatively connected with the latch 167. This operative connection may be a direct connection as shown, or it may include any desired power multiplying arrangement. The energization of the solenoid withdraws the latch 167 from the groove 164 and permits the sleeve 63a to snap upwardly, thereby relieving the plunger of the downward pressure of the spring 66a, and starting the test with the plunger only subjected to the lifting pressure of the lower spring 42. It will be seen from the foregoing that in this arrangement it is only necessary that the operator press down the plunger head 61a sufficiently far to cause engagement of the latch 167 in the groove 164, whereupon the subsequent operation of releasing this downwardly acting spring pressure is automatically performed precisely at the proper time in the motion of the pointer arm. The spring 66a is proportioned so that this range of movement of the sleeve 63a will always exert sufficient downward pressure to overcome the spring 42 and to exert sufficient additional pressure on the upper plate element for quickly predetermining the thickness of the oil film, irrespective of the viscosity of the oil being tested. This automatic spring tripping function can be embodied in any of the constructions previously described.

In Figure 11 I have also illustrated another automatic control feature which serves to make the starting of the electric motor in the indicator head responsive to the establishment of the predetermined thickness of oil film. In this construction, the spacing studs 23 are electrically insulated from the lower plate 21, and, for cooperation therewith, the upper plate 22 is provided with a companion set of studs or contacts 23a, also electrically insulated from their plate 22. For clarity of illustration, these studs or contacts 23, 23a have been shown in enlarged proportions in Figure 11. When all of the companion pairs of studs or contacts are in abutting contact, at which time a predetermined thickness of oil film has been established, a series circuit is completed through wires 182 and 183. The manner in which these several pairs of contacts are connected together in series is clearly illustrated. The wire 182 conducts current from the supply wire 171, and the wire 183 connects with one side of a solenoid coil 184. The other side of this coil is connected through wire 185 with the other supply wire 172. It will thus be seen that at the instant that all of the spacing studs and their associated contacts are in engagement, predetermining a definite thickness of oil film, the solenoid coil 184 will be energized. This attracts a core 186 which is operatively connected with a switch arm 187, pivoted at 188. The other end of said switch arm carries a movable contact 191 which is swung into engagement with a stationary contact 192 upon the energization of the solenoid coil 184. The engagement of said contacts completes a circuit through wires 193 and 194 connecting to one side of the motor 114, the other side of said motor being connected with the other supply wire 172. It will thus be seen that the starting of said motor is dependent first upon the body of oil having been reduced to a film of predetermined thickness, such aiding in minimizing the effect of possible variables in testing oils of widely different viscosities. A biasing spring 196 is operatively connected with the switch arm 187 whereby it swings to an over-center position with regard to the pivot 188 for yieldingly holding the switch arm in either its closed or open position. Hence, when the spacing studs 23 and their contacts 23a separate in the gradual raising of the upper plate, prior to the complete disruption of the oil film, the resulting interruption of the series circuit through the wires 182 and 183 will not separate the switch contacts 191 and 192, which will be yieldingly held in their closed position by the spring 196, thereby insuring continued operation of the motor 114. However, as soon as the oil film breaks, the collar 49a snaps upwardly with the plunger and with the upper plate and strikes the projecting end of the switch arm 187 for throwing this switch arm to open circuit position, thereby stopping the motor 114. The spring 196 then holds the switch arm in this open circuit position until the solenoid 184 is again energized in the performance of another testing operation.

If desired, an electrically operated limit control may also be associated with the switch 187, so that the motor circuit will be automatically opened when the indicating pointer reaches the maximum position. This would avoid the necessity of any slip clutch, described in connection with Figure 3, or of the pinion running off the end of the rack bar, described in connection with Figure 5. In this automatic limit control, a contact 197 has insulated mounting in the dial or gauge plate of the indicator head in position to be engaged by the same contact element on the pointer arm which engages the contact 174. This contact 197 is positioned at the maximum limit of movement of the pointer arm. A wire 198 extends from said contact to one side of a solenoid coil 199, and extending from the other side of said coil is a wire 201 which connects with the supply wire 171. A core 202 in said solenoid coil is operatively connected with the switch arm 187 on the other side of the pivot 188, whereby energization of the coil 199 is operative to separate the switch contacts 191, 192. It will thus be seen that should the viscosity of the lubricant exceed the capacity of the machine, the motor circuit will be automatically opened when the pointer arm reaches its maximum position in engagement with the contact 197. It will be evident that the two control contacts 174 and 197 can be appropriately arranged in the vertically disposed scales 82' of the embodiment disclosed in Figures 5 and 6, in adapting these control functions to that construction.

The initial calibration of the machine and any subsequent adjustments thereof may be easily effected by screwing the adjusting nut 41 upwardly or downwardly to vary the effective pressure of the lifting spring 42. If desired, any suitable seal or lock may be associated with the removable plate 43 over the end of the arm 32 for preventing unauthorized access to this adjusting nut. In lieu of the spring 42, a suitable arrangement utilizing a weight may be employed. As previously remarked, I have found it desirable to make the lower plate of slightly larger diameter than the upper plate, but this is not essential. Thin oils when heated to the temperature predetermined by the plates have a tendency to run, and by making the lower plate larger the outside quantity of oil on this lower plate tends to restrict outward flow of the oil film which is defined directly between the plates. This outer ring of oil is of definite volume around the parting line between the plates and may maintain the oil seal for a longer time interval. When the downward pressure transmitted through the springs 66, 67 or 66a is released, it may be desirable to provide suitable motion retarding or cushioning means so that the recoil from such spring or springs shall not transmit upwardly acting shock to the top plate 22. For example, in Figure 11, the spring pressed ball 204 pressing against the sleeve 63a, is conventionally representative of a frictional or other suitable motion retarding or cushioning means for this purpose. The time graduations on the indicating head can, if desired, be made to correspond to seconds or some unit of time closely approximate thereto, such being largely determined by the areas of the plates 21, 22 and by the pressure established in the spring 42. For example, a reading of S. A. E. 40 might be arranged to correspond to 40 seconds. In the operation of the machine, the plates predetermine a body of oil of predetermined cross-sectional area and predetermined thickness, and as soon as the spring 42 becomes effective, tending to separate the plates, this body starts to change shape, atmospheric pressure and endwise tension between the plates resulting in the body diminishing in cross-sectional area and increasing in thickness, until the cohesion in the reduced cross-sectional area fails to sustain the separating force, whereupon the body is disrupted and the top plate quickly moves upwardly. Should differences in atmospheric pressure at different localities result in any appreciable variation of readings, the scale indicia or the pressure of the spring 42 may be appropriately adjusted to these differences.

While I have illustrated and described what I regard to be the preferred embodiments for carrying my invention into effect, nevertheless it will be understood that such are merely exemplary and that numerous departures may be made therefrom within the broad scope of the invention. Furthermore, while the principal utility of the invention would apparently reside in the testing of the viscosities of lubricating oils, nevertheless the invention may also be employed in other fields for testing the viscosity, cohesion, adhesion, or like properties of other liquids and semi-liquid materials.

I claim:—

1. Apparatus of the class described comprising two plates adapted to receive a quantity of the liquid therebetween and arranged for relative converging motion to establish a body of the liquid of predetermined dimensions between said plates, and arranged for relative separating motion to test the resistance of said body of liquid to said separating motion, a reciprocable member connected to one of said plates, a knob for transmitting pressure to said reciprocable member for causing said relative converging motion, spring means interposed between said knob and said reciprocable member for yieldingly effecting said converging motion, spring means coacting with said reciprocable member for causing said relative separating motion, electrically operated time indicating means, and means for controlling the operation of said indicating means in response to the time interval that the body of liquid effectively resists said separating motion.

2. Apparatus of the class described comprising two plates adapted to receive a specimen of the liquid therebetween and arranged for relative converging motion to establish a film of the liquid between said plates, and arranged for relative separating motion to test the resistance of said film to said separating motion, a reciprocable member connected to one of said plates, a knob for transmitting pressure to said reciprocable member for causing said relatively converging motion, a spring pressure gauge for indicating the pressure being transmitted from said knob to said reciprocable member, spring means coacting with said reciprocable member for causing said relative separating motion, electrically operated time indicating means arranged for actuation while said latter spring means is functioning, and a switch arranged to interrupt the operation of said indicating means in response to the separation of said plates when said film fails to resist said separating motion.

3. Apparatus of the class described comprising two plates adapted to receive a quantity of the liquid therebetween and arranged for relative converging motion to establish a body of the liquid of predetermined dimensions between said plates, and arranged for relative separating motion to test the resistance of said body of liquid to said separating motion, a reciprocable member connected to one of said plates, a knob carried by said reciprocable member for transmitting pressure thereto for causing said relative converging motion, spring means interposed between said knob and said reciprocable member for yieldingly effecting the application of said pressure, and spring means coacting with said reciprocable member for causing said relative separating motion.

4. Apparatus of the class described comprising two plates adapted to receive a specimen of the liquid therebetween and arranged for relative converging motion to establish a film of the liquid between said plates, and arranged for relative separating motion to test the resistance of said film to said separating motion, a reciprocable member connected to one of said plates, means including a knob operable to apply pressure to said reciprocable member for causing said relatively converging motion, a spring pressure gauge for indicating the pressure being applied to said reciprocable member, spring means coacting with said reciprocable member for causing said relative separating motion, and automatic time indicating means responsive to such relative separating motion.

5. Apparatus of the class described comprising two plates adapted to receive a quantity of the liquid therebetween and arranged for relative converging motion to establish a body of the liquid of predetermined dimensions between said plates, and arranged for relative separating motion to test the resistance of said body of liquid to said separating motion, means operable to manually apply a pressure to converge said plates, spring means energized by the converging of said plates for causing relative separating motion of the plates, when the manually applied pressure is released, a control circuit energized in response to movement of said plates to converged position, and timing means in said circuit arranged to run when said circuit is energized, said timing means having means to indicate the termination of a predetermined lapsed interval from the starting thereof and the beginning of the time interval during which the body resists said spring.

CLIFFORD S. HEALY.